(12) United States Patent
Cuadrado

(10) Patent No.: US 9,074,330 B2
(45) Date of Patent: Jul. 7, 2015

(54) DEVICE FOR INCORPORATING AND DISTRIBUTING SAND AND AGGREGATE IN SYNTHETIC GRASS

(76) Inventor: Jean-Claude Cuadrado, Villeneuve de la Raho (FR)

(*) Notice: Subject to any disclaimer, the term of this patent is extended or adjusted under 35 U.S.C. 154(b) by 132 days.

(21) Appl. No.: 13/805,219

(22) PCT Filed: Jul. 26, 2011

(86) PCT No.: PCT/FR2011/000445
§ 371 (c)(1),
(2), (4) Date: Mar. 7, 2013

(87) PCT Pub. No.: WO2012/022855
PCT Pub. Date: Feb. 23, 2012

(65) Prior Publication Data
US 2013/0153249 A1    Jun. 20, 2013

(30) Foreign Application Priority Data

Jul. 27, 2010    (FR) ...................................... 10 03138

(51) Int. Cl.
| | | |
|---|---|---|
| *A01B 35/06* | (2006.01) | |
| *A01B 45/00* | (2006.01) | |
| *E01C 23/06* | (2006.01) | |
| *E01C 23/082* | (2006.01) | |

(52) U.S. Cl.
CPC ................. *E01C 23/06* (2013.01); *A01B 45/00* (2013.01); *E01C 23/082* (2013.01)

(58) Field of Classification Search
USPC ......... 172/142, 175, 177, 179, 193, 195, 199, 172/643; 404/111
IPC .................................. A01B 35/06,45/00, 49/02
See application file for complete search history.

(56) References Cited

U.S. PATENT DOCUMENTS

|  |  |  |  |  |
|---|---|---|---|---|
| 839,308 | A | * | 12/1906 | Nelson ........................... 172/142 |
| 881,566 | A | * | 3/1908 | Everingham ................... 172/142 |
| 1,833,878 | A | * | 11/1931 | Adams ........................... 172/199 |
| 3,525,201 | A | * | 8/1970 | Kaufman ............................ 56/7 |
| 4,685,524 | A | * | 8/1987 | Williamson .................. 172/54.5 |
| 5,833,013 | A | * | 11/1998 | Davis ............................. 172/612 |
| 6,626,246 | B2 | * | 9/2003 | Gerber et al. ................. 172/142 |
| 6,655,469 | B1 | * | 12/2003 | Davis ............................. 172/622 |
| 7,464,528 | B1 | * | 12/2008 | Street et al. ..................... 56/371 |
| 2003/0226671 | A1 | | 12/2003 | Davis |
| 2013/0043051 | A1 | * | 2/2013 | Heying ......................... 172/145 |

FOREIGN PATENT DOCUMENTS

| | | |
|---|---|---|
| EP | 1 356 720 A1 | 10/2003 |
| GB | 2 248 757 A | 4/1992 |
| NO | 326 096 B1 | 9/2008 |

OTHER PUBLICATIONS

International Search Report, Jun. 15, 2012, from International Phase of the instant application.

* cited by examiner

*Primary Examiner* — Gary Hartmann
(74) *Attorney, Agent, or Firm* — Jackson Patent Law Office

(57) ABSTRACT

An apparatus to distribute materials in an artificial lawn includes a row of prongs joined to a transverse support, the row of prongs being configured to lift the blades of the artificial lawn, thereby enhancing penetration of the materials between the blades. The apparatus is configured to angularly preadjust the transverse support according to multiple adjustment positions so as to vary pressure of the prongs on the lawn; and a row of brushes configured to improve distribution of materials remaining on a surface of the lawn after the passage of the row of prongs.

9 Claims, 2 Drawing Sheets

DEVICE FOR INCORPORATING AND DISTRIBUTING SAND AND AGGREGATE IN SYNTHETIC GRASS

FIELD OF THE INVENTION

The invention relates to a device designed for incorporation and distributing, by mixing, sand used to weigh down an artificial lawn as well as rubbery granules used to improve its flexibility.

TECHNOLOGICAL BACKGROUND

An artificial lawn is comprised of supple blades joined to a carpet itself layed on a filling.

All the difficulty resides:

a) during the laying of the lawn:

in mixing the sand and the granules as closely as possible to the carpet because the blades of lawn are flattened by the spreading of sand and granulate;

in distributing them as homogeneously as possible either first in their mixture and second on the surface of the carpet;

in treating the edges of the carpet that are difficult to access by basic mixing and distribution modules;

and this by successive layers and passages;

b) during the maintenance of lawn:

in mixing the mixture of sand and granules as closely as possible to the carpet while maintaining the aforementioned homogeneous mixture in its composition as well as in its spatial distribution;

in treating the edges of carpet;

and this, in both cases, without attacking or pulling the blades and without displacing the carpet.

No known device, based on brushes or prongs, meets these various criteria.

Indeed, known is:

the document FR2813491, which describes a machine for the maintenance of an artificial lawn comprising at least one device for combing the fibers, consistuted by combs or teeth, driven in rotation by a "motor, pulleys and belts" assembly;

the document EP1356720, which describes an apparatus for the maintenance of a lawn comprising a central part and two lateral extensions deployable so as to work equally on a reduced surface or on an extended surface, the aforementioned parts being carriers of brush sets.

In the first document, the teeth are driven in rotation, in the manner as a lawn dethatcher, having major consequences: deterioration and pulling of the blades, displacement and abrasion of the carpet, wear and fouling of the belts, maintenance of the pulleys and of the engine.

In the second document, the edges of the field are not treated since the lateral extensions, which are simple expansion modules, do not have features provided for this purpose

SUMMARY OF THE INVENTION

The invention aims to provide a device designed for the incorporation and the distribution, by mixing, of sand and granules which eliminates the aforementioned disadvantages.

To do this, the device according to the invention has been designed for:

during the first spreading, the layer of mixture to be distributed being thin, exerting a low pressure on the lawn in order to not displace the carpet;

as the layer thickens, exerting an increasingly greater pressure;

treating the edges of fields that are not accessible by the devices that do not have lateral means exclusively designed for this purpose;

increasing the number of rows as the spreading progresses, which is effectued by successive layers;

reducing the number of passages by its rapid mixing resulting from the combination of prongs and brushes on a common frame as well as their cooperation;

being useable with or without lateral extensions, apart from the fold-down aspect, which are also detachable (removable);

being equally useable for the installation and the maintenance of lawn, with or without its lateral extensions.

The device according to the invention is essentially characterized in that it comprises, supported by a common frame and successively acting in cooperation:

a) a first means designed to improve, with each passage, by lifting the blades, the penetration of sand and granules between the blades of the lawn as closely possible to the carpet, the aforementioned means being comprised of at least one row of prongs joined to a transverse support itself joined to a means configured to angularly preadjust the aforementioned support according to multiple adjustment positions so as to increase the pressure of the prongs on the lawn as the advancement of the spreading progresses, which is effected by successive passages b) a second means designed to improve, at each passage, the distribution, on the aforementioned lawn, of the sand and granules remaining on the surface after the passage of the first means, the aforementioned second means being comprised of at least one row of brushes comprising:

two contiguous central brushes, positioned V-shaped, adapted for obliquely displacing, in the direction of the free ends of the aforementioned brushes, a portion of the sand and granules;

at least two lateral brushes, each positioned on each side of the central brushes, parallel to the one that it is opposing, adapted for obliquely displacing in the direction of the exterior ends of the aforementioned brushes, a portion of the sand and granules.

The action of brushs is effected immediately after the passage of prongs before the blades resettle. That which would not could be the case if this operation were being performed by another machine, carrier of brushes only, during a second passage. In addition, the latter could not treat in like manner the blades flattened by the wheels of the previous machine.

The device according to the invention is also characterized in that the the frame supports, in addition, lateral extensions, designed to improve the work on the edges of fields covered by artificial lawn, provided with means configured to enable the aforementioned extensions to be folded on the aforementioned frame or be detached from it, each comprising:

a) at least one row of prongs obliquely positioned in order that their ends extend beyond the external side of each lateral extension, the aforementioned prongs being joined to a transverse support itself joined to a means configured for angularly preadjusting the aforementioned support according to multiple adjustment positions so as to increase the pressure of the prongs on the lawn as the spreading progresses, which is effectuated by successive passages;

b) at least one brush obliquely positioned, in order that its effect tends to bring the sand and granules toward the interior of the field.

By way of example, the base module has a width of 2 meters and the lateral extensions have a width of 0.35 meters. The prongs and the brush of each lateral extension, because of their oblique positioning, extend 5 to 10 cm from their own frame, which enables working up to the edge of the lawn, which is not possible the central base module.

According to a particular implementation of the invention, the prongs are made of an elastic material designed to enable their disengagement when they encounter a resistance capable of damaging them.

In the preferred implementation of the invention:

a) the frame comprises three rows of prongs joined to three transverse supports themselves joined to a common means designed for:

first, angularly preadjusting, simultaneously, the aforementioned supports according to multiple adjustment positions so as to increase the pressure of the prongs on the lawn as the spreading progresses;

second, separately joining each of the aforementioned supports to the aforementioned means so as to increase the number of rows of operating prongs as the spreading progresses.

b) each lateral extension comprises two rows of prongs joined to two transversal supports themselves joined to a common means designed for:

first, angularly preadjusting, simultaneously, the aforementioned support according to multiple adjustment positions so as to increase the pressure of the prongs on the lawn as the spreading progresses;

second, separately joining each of the aforementioned supports to the aforementioned means so as to increase the number of rows of operating prongs as the spreading progresses.

In addition, the device according to the invention, by regular maintenance usage, avoids the formation of foam and the proliferation of grasses.

DESCRIPTION OF THE FIGURES

The features and advantages of the invention will appear more clearly upon reading the detailed description that follows of at least one preferred implementation mode of which, given by way of non limiting example and shown in the accompanying drawings.

In these drawings.

DETAILED DESCRIPTION OF THE INVENTION

Figure 1:
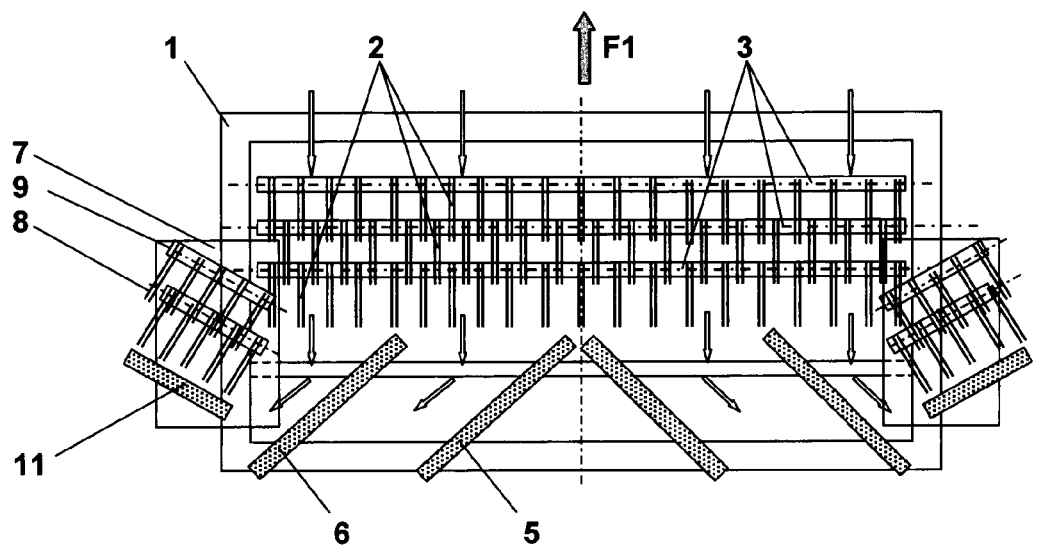
FIG. 1 is a bottom view of the device according to the invention showing only the frame comprising 3 rows of prongs and 1 row of 4 brushes as well as the extensions, deployed, each comprising two rows of prongs and 1 brush.
Figure 2:
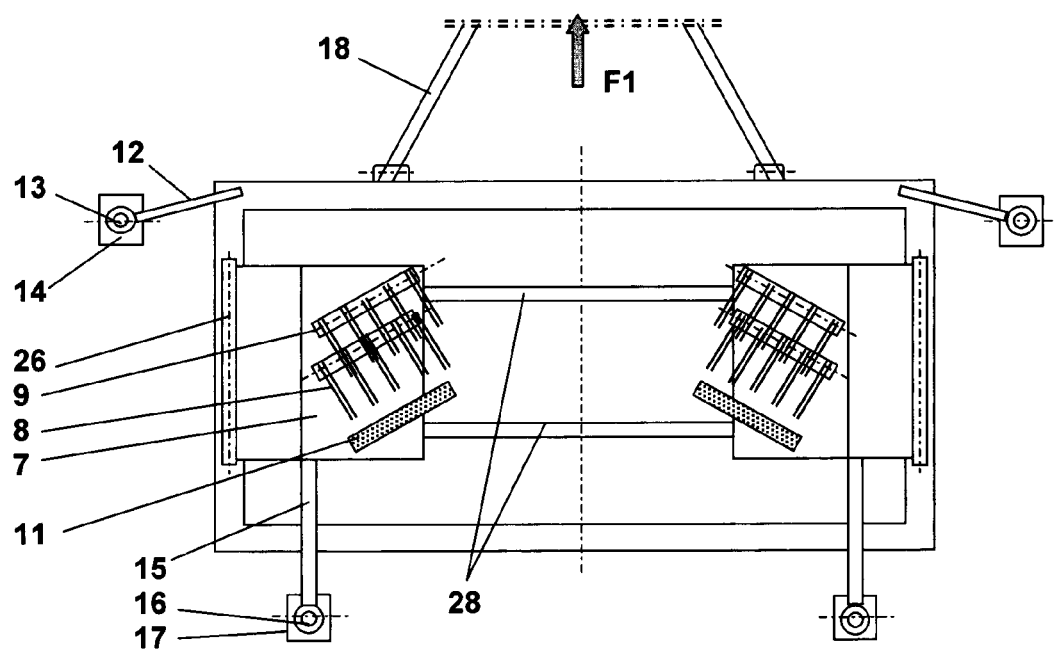
FIG. 2 is a top view of the device showing only the frame with its rolling means, the base of the towing boom and folded extensions each with the prongs and the brush.
Figure 3:
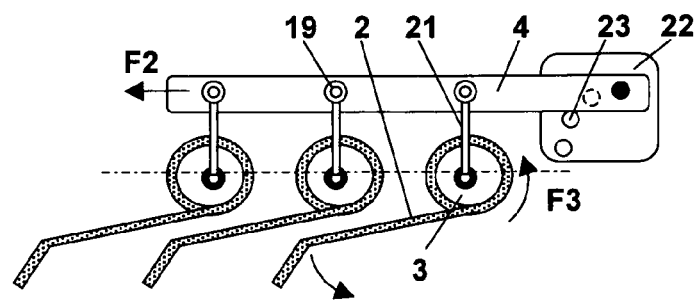
FIG. 3 is a side view showing only 3 rows of prongs of the frame connected to the means adapted for preadjusting their pressure on the lawn.
Figure 4:
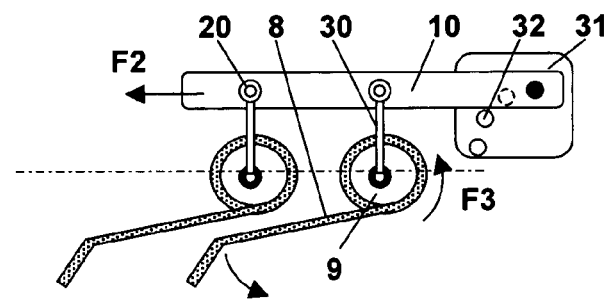
FIG. 4 is a side view showing only 2 rows of prongs of the extensions connected to the means adapted for preadjusting their pressure on the lawn.
Figure 5:
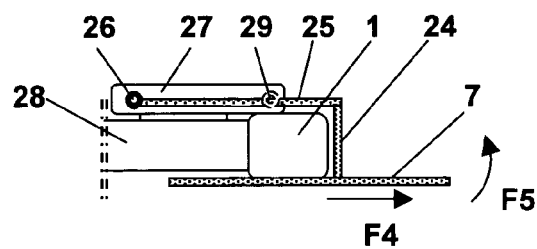
FIG. 5 is a side view of a lateral extension emphasizing its design and its mounting relative to the frame of the device.

The device shown in the figures is designed to improve the incorporation and distribution, by mixing, in an artificial lawn, sand used to weigh it down, as well as rubber granules used to improve its flexibility, the aforementioned lawn being comprised of supple blades joined to a carpet.

The device according to the invention comprises, supported by a common frame (1) and acting successively and in cooperation:

a) a first means designed to improve, with each passage, by lifting the blades, the penetration of sand and granules between the blades of the lawn as closely possible to the carpet, the aforementioned means comprised of at least one row of prongs (2) joined to a transverse support (3) itself joined to a means (4, 21, 22) configured to angularly preadjust the aforementioned support (3) according to multiple adjustment positions (23) so as to increase the pressure of the prongs (2) on the lawn as the advancement of the spreading progresses which is effected by successive passages;

b) a second means designed to improve, at each passage, the distribution, on the aforementioned lawn, of the sand and granules remaining on the surface after passage of the first means, the aforementioned second means being comprised of at least one row of brushes (5, 6) comprising:

two contiguous central brushes (5), positioned V-shaped, adapted for obliquely displacing, in the direction of the free ends of the aforementioned brushes, a portion of the sand and granules;

at least two lateral brushes (6), each positioned on each side of the central brushes (5), parallel to the one that it is opposing, adapted for obliquely displacing in the direction of the exterior ends of the aforementioned brushes, a portion of the sand and granules.

The frame (1) supports, in addition, lateral extensions (7), designed to improve the work at the edges of fields covered by artificial lawn, provided with means (25, 26, 27) configured to enable the aforementioned extensions to be folded on the aforementioned frame (1) or be detached (removed) from it, each comprising:

a) at least one row of prongs (8) obliquely positioned in order that their ends extend beyond the external side of each lateral extension (7), the aforementioned prongs being joined to a transverse support (9) itself joined to a means (10, 30, 31) configured for angularly preadjusting the aforementioned support (9) according to multiple adjustment positions so as to increase the pressure of the prongs (8) on the lawn as the spreading progresses which is effectuated by successive passages;

b) at least one brush (11) obliquely positioned, in order that its effect tends to bring the sand and granules toward the interior of the field.

The prongs (2) and (8) are preferably made of a resilient material designed to enable their disengagement when they encounter a resistance capable of damaging them.

The device according to the invention can preferably comprise three rows of prongs (2) joined to three transverse supports (3) themselves joined to a common means (4) designed to:

first, angularly preadjuste, simultaneously, the aforementioned supports according to multiple adjustment positions in such manner as to increase the pressure of the prongs (2) on the lawn as the spreading progresses;

second, separately joining each of the aforementioned supports (3) to the aforementioned means (4) so as to increase the number of rows of operating prongs (2) as the spreading progresses.

The preadjusting means may be comprised of an actuating arm (4) connected to a connecter board (22) provided with multiple orifices (23) adapted to define multiple angular adjustment positions of the supports (3) that are connected to the aforementioned arm (4) by connecting rods means (21) (22).

Each support (3) can be individually detached from the preadjusting means (4) using a separating means (19), in particular of the screw and nut or quick coupler type, designed to disengage the corresponding end from the rod (21).

Each lateral extension (7) can preferably comprise two rows of prongs (8) joined to two transversal supports (9) themselves joined to a common means (10) designed to:

first, angularly preadjusting, simultaneously, the aforementioned supports according to multiple adjustment positions (32) so as to increase the pressure of the prongs (8) on the lawn as the spreading progresses;

second, separately joining each of the aforementioned supports (9) to the aforementioned means (10) so as to increase the number of rows of operating prongs (8) as the spreading progresses.

Each support (9) can be detached individually from the preadjustment means (10) using a separating means (20), in particular of the screw and nut or quick coupler type, designed to disengage the corresponding end from the connecting rod (30).

Each lateral extension, carrier of the prongs (8) and of the brush (11), is comprised of a horizontal connecter board (7) passing under the frame (1), a vertical or inclined offset wall (24), a horizontal upper wall (25) whose end is connected to a joint (26) joined to a support (27), itself joined to slide rails (28) of the frame (1), that enables, by sliding, the horizontal displacement (F4) thereof between an inner working position, joint in position (26), wherein the connecter board (7) passes under the frame (1) and an external rest position, joint in position (29), where it is disengaged in order to be folded (F5) on the aforementioned frame.

The frame (1) can comprise:

laterally, at the front, at the exterior of the working area, offset arms (12) supporting axels (13), carriers of wheels (14);

at the rear, supporting arms (15) supporting the axels (16), carrier of wheels (17).

The axels (13) and (16) can comprise means enabling preadjusting their height, thus that of wheels (14, 17), relative to their respective supports (12) and (15), thus of the frame (1).

The frame (1) can be connected to a motorized wheeled vehicle:

by means of a towing boom (18); or by means of a 3 points device.

The arrow F1 indicates the direction of advance of the frame.

The arrow F2 indicates the linear movement of the preadjusting means (4, 10) which is translated by a rotary movement, indicated by the arrow F3, of the prong supports (3, 9).

The actuating arm (10) is connected to a connecter board (22) provided with multiple orifices (23) adapted to define various angular adjustment positions of the supports (9), thus of pressure of the prongs (8).

Each lateral extension, carrier of the prongs (8) and of the brush (11), is comprised of a horizontal connecter board (7) passing under the frame (1), a vertical or inclined wall offset wall (24), a horizontal upper wall (25) whose the end is connected to a joint (26) joined to a support (27), itself joined to slide rails (28) of the frame (1), that enables, by sliding, the horizontal displacement (arrow F4) thereof between an inner working position (joint at position 26) where the connecter board (7) passes under the frame (1) and an external resting position (joint at position 29) where it is disengaged in order to be folded (arrow F5) on the aforementioned frame.

The frame (1) can comprise:

laterally, at the front, at the exterior of the working area, offset arms (12) supporting axels (13), carriers of wheels (14);

at the rear of the supporting arms (15) supporting axels (16) carrier of wheels (17).

The axels (13) and (16) can comprise means, particularly including wedges or telescopic devices, enabling preadjusting their height, thus that of the wheels (14, 17), relative to their respective supports (12) and (15), thus of the frame (1).

The frame (1) can be connected:

to a motorized wheeled vehicle by means of a towing boom (18); or to a motorized wheeled vehicle by means of a 3 points device.

Of course, the person of skill in the art will be able to implement the invention as described and shown by applying and adapting known means without it being necessary to describe or shown them.

He will also be able to also foresee other variations without departing from its scope, which is determined by the terms of the claims.

The invention claimed is:

1. An apparatus to distribute materials in an artificial lawn, the artificial lawn including a carpet and supple blades joined to the carpet, the apparatus comprising:

a frame;

a transverse support supported by the frame;

a row of prongs joined to the transverse support, the row of prongs being configured to lift the blades, thereby enhancing penetration of the materials between the blades;

a means configured to angularly preadjust the transverse support according to multiple adjustment positions so as to vary pressure of the prongs on the lawn; and a row of brushes comprising a first central brush, a second central brush, positioned such that the first and second central brushes form a V-shaped for obliquely displacing, in a direction of ends of the first and second central brushes, a portion of the materials, a first lateral brush opposing the first central brush and parallel to the first central brush, a second lateral brush opposing the second central brush and parallel to the second central brush, the first and second lateral brushes being adapted for obliquely displacing, in a direction ends of the first and second lateral brushes, a portion of the materials, the row of brushes thereby improving distribution of materials remaining on a surface of the lawn after the passage of the row of prongs wherein the frame comprises:

a first axel;

a first offset arm, mounted laterally at a front of the frame, the first axel being configured to have a height preadjusted relative to the first offset arm;

a second axel; and a second offset arm, mounted at a rear of the frame, the second axel being configured to have a height preadjusted relative to the second offset arm.

2. An apparatus according to claim 1 wherein the prongs are made of an elastic material.

3. An apparatus according to claim 1 further including a connecter board provided with multiple orifices adapted to define multiple angular adjustment positions of the supports.

4. An apparatus according to claim 1 further including a towing boom connected to the frame and configured to be connected to a motorized wheeled vehicle.

5. An apparatus according to claim 1 further including a 3 points device connected to the frame and configured to be connected to a motorized wheeled vehicle.

6. An apparatus according to claim 1 further including three transverse supports; and three rows of prongs joined to the three transverse supports, the three transverse supports being configured to be angularly preadjusted simultaneously, in multiple positions of adjustment so as to vary pressure of the prongs on the lawn.

7. An apparatus to distribute materials in an artificial lawn, the artificial lawn including a carpet and supple blades joined to the carpet, the apparatus comprising:
- a frame;
- a transverse support supported by the frame;
- a row of prongs joined to the transverse support, the row of prongs being configured to lift the blades, thereby enhancing penetration of the materials between the blades;
- a means configured to angularly preadjust the transverse support according to multiple adjustment positions so as to vary pressure of the prongs on the lawn; and
- a row of brushes comprising
  - a first central brush,
  - a second central brush, positioned such that the first and second central brushes form a V-shaped for obliquely displacing, in a direction of ends of the first and second central brushes, a portion of the materials,
  - a first lateral brush opposing the first central brush and parallel to the first central brush,
  - a second lateral brush opposing the second central brush and parallel to the second central brush, the first and second lateral brushes being adapted for obliquely displacing, in a direction ends of the first and second lateral brushes, a portion of the materials, the row of brushes thereby improving distribution of materials remaining on a surface of the lawn after the passage of the row of prongs, further including, lateral extensions, supported by the frame, to improve work at edges of a field covered by the artificial lawn, each lateral extension defining an external side, each later extension comprising:
- a transverse support;
- a row of prongs having ends extending beyond the external side, the row of prongs being joined to a transverse support, the transverse support being configured to be angularly preadjusted so as to vary pressure of the row of prongs on the lawn; and
- a brush obliquely positioned to bring the materials toward an interior of the field, the lateral extensions being configured to be folded on the frame or be detached from the frame.

8. An apparatus according to claim 7 wherein each lateral extension comprises
- two transverse supports; and
- two rows of prongs joined to the two transverse supports, the two transverse supports being configured to be angularly preadjusted simultaneously, in multiple positions of adjustment so as to vary the pressure of the prongs on the lawn.

9. An apparatus according to claim 7 wherein each lateral extension further includes a horizontal connecter board configured to move between a working position wherein the connecter board passes under the frame and an external rest position wherein the connector board is folded on the frame.

* * * * *